United States Patent [19]

Stoeberl

[11] 4,120,632

[45] Oct. 17, 1978

[54] MOLDS FOR PRODUCTION OF PLASTICS MATERIAL BOATS

[75] Inventor: Helmut Stoeberl, Gstadt, Germany

[73] Assignee: Klepper-Werke Kommanditgesellschaft, Germany

[21] Appl. No.: 698,151

[22] Filed: Jun. 21, 1976

Related U.S. Application Data

[60] Continuation-in-part of Ser. No. 450,785, Mar. 13, 1974, abandoned, which is a division of Ser. No. 323,319, Jan. 12, 1973, Pat. No. 3,840,926.

[30] Foreign Application Priority Data

Jan. 12, 1972 [DE] Fed. Rep. of Germany ....... 2201310

[51] Int. Cl.² .............................................. B29C 1/00
[52] U.S. Cl. ............................. 425/405 R; 425/451.9; 425/DIG. 238
[58] Field of Search ..................... 425/61, 405 R, 437, 425/DIG. 238, 451.9, 412

[56] References Cited

U.S. PATENT DOCUMENTS

| | | | |
|---|---|---|---|
| 2,916,909 | 12/1959 | Miller | 249/28 X |
| 3,059,738 | 10/1962 | Lutz | 249/210 X |
| 3,124,626 | 3/1964 | Graham et al. | 425/437 X |

*Primary Examiner*—Richard B. Lazarus
*Attorney, Agent, or Firm*—Hill, Gross, Simpson, Van Santen, Steadman, Chiara & Simpson

[57] ABSTRACT

Molds for the production of fiber reinforced plastics material boat hulls filled with hard foam plastics material are constructed of plastics material and reinforced against deformation by rigid cores and tension bands to accurately shape the hulls even when subjected to high stresses during molding and foam filling. The molds have separable top and bottom halves connected around their peripheries by interfitting flanges forming a seal and also provided with ventilating channels. The outer shell of the bottom mold half between the flanges has a free catenary curve configuration supporting the reinforcing cores for the molding surface or inner shell of the mold.

15 Claims, 17 Drawing Figures

MOLDS FOR PRODUCTION OF PLASTICS MATERIAL BOATS

RELATED APPLICATIONS

This application is a continuation-in-part of my application U.S. Ser. No. 450,785, filed Mar. 13, 1974 now abandoned which is a division of my parent application entitled, "Boat Hull," U.S. Ser. No. 323,319 filed Jan. 12, 1973, now U.S. Pat. No. 3,840,926 issued Oct. 15, 1974, claiming priority of Jan. 12, 1972 based on German patent application, No. P 22 01 319.0-32 and the full disclosures of these applications are incorporated herein by reference.

BACKGROUND OF THE INVENTION

1. Field of the Invention

This invention relates to plastics material molds for the production of foam-filled fiber reinforced plastics material boat bodies and specifically deals with the reinforcement and sealing of such molds. The molds of this invention are especially suitable for the production of sailboat hulls having outer shells and inner bottoms sealed together around their periphery with foam plastic-filled chambers therebetween where the foam is interlocked with the walls defining the chambers by fibrous laminations having the fibers embedded in the foam and firmly interlocked with the shells.

2. Prior Art

Foam-filled hollow boat shells are known in the art as for example, in the U.S. Pat. Nos. 2,909,791; 3,531,809; and 3,435,470, French Pat. No. 1,443,919 and British Pat. No. 931,244. Longitudinal and transverse stringers between inner and outer shells of boat hulls are also known, for example, in U.S. Pat. No. 3,956,292; British Pat. No. 966,508 and German Pat. No. 940,787. These prior art disclosures, however, deal with motorboats and their constructions are not suitable for racing type sailboats where both the keel and the deck must provide maximum stiffness and minimum weight. The prior art constructions were generally made by coating mold forms with plastics material, draping fibrous material laminations over the gel coating, and separately forming outer and inner shells thereby requiring complicated assembly and sealing procedures.

SUMMARY OF THIS INVENTION

This invention now provides for the molding of plastics material boat hulls having hard plastics material cores integrally anchored to a thin outer boat shell and an inner bottom shell. According to this invention, molds composed of plastics sheet material have outer bottom portions suspended from rigid peripheral flanges supporting ribs or cores which support inner mold surfaces. The flanges are sealed together and may have channels for evacuation of air to, for example, pull a vacuum loading bag tightly against fabric laminations laid in the mold over an unset plastics coating so that the plastics material may be drawn into the interstices of the fabric to provide a firm anchor or interlock of the fabric material with the plastics material forming the shell. The channels also permit escape of air from the molding cavity during the force feeding of the foam material into the mold cavity.

It is then an object of this invention to provide molds for producing foam-filled plastic boat hulls.

Another object of this invention is to provide reinforced plastic molds especially suitable for the production of boat hulls.

A further object of the invention is to provide molds for producing sailboat foam-filled hulls of fiber reinforced plastics material.

Another object of the invention is to provide molds having outturned flanges suspending a mold bottom in the form of a catenary curve.

Another object of the invention is to provide a plastics material mold for the production of fiber reinforced plastic boat hulls which are held in shape by tensioned bands.

Other and further objects of this invention will be apparent to those skilled in this art from the following detailed description of the annexed sheets of drawings which, by way of preferred examples only, illustrate several embodiments of the invention.

IN THE DRAWINGS

FIG. 4b is a side elevational view of the assembly of FIG. 4a.

DESCRIPTION OF THE PREFERRED EMBODIMENTS

Figure 1A:
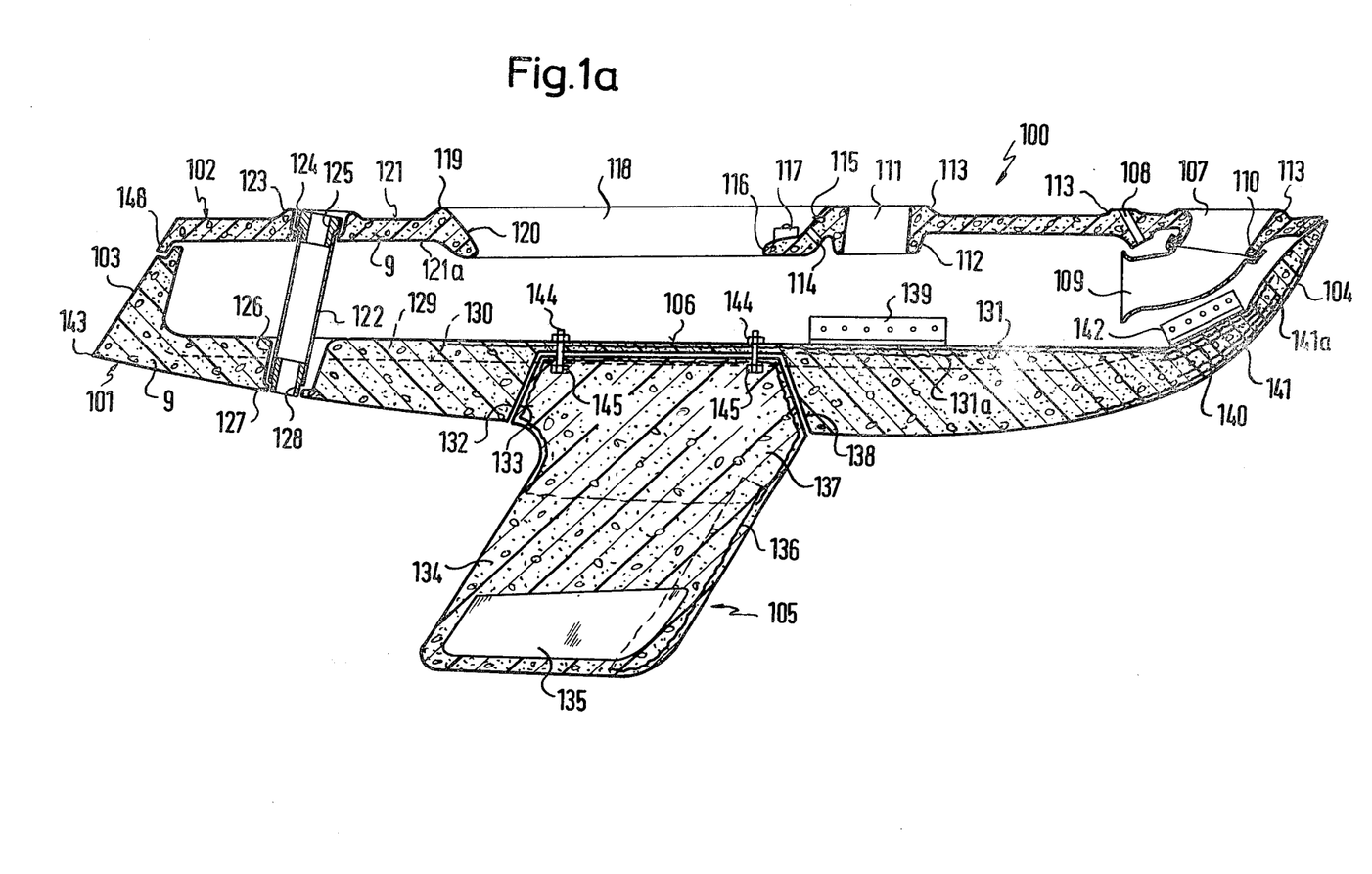
FIG. 1a is a longitudinally, somewhat diagrammatic, cross sectional view of a sailboat body produced by the molds of this invention.

The boat hull 100 of FIG. 1a consists of a boat shell 101 and a deck 102. The shell 101 has a stern 103 sloping forwardly from a sharp edge 143 and a spoon-type bow 104. A keel fin 105 is suspended from the bottom of the boat shell in a manner to be more fully hereinafter described.

The boat shell has an inner bottom shell 106 sloping upwardly to the top of the boat shell 101 and cooperating therewith to define a chamber filled with plastics foam material 9 providing a rigid core for the boat.

A spinnaker funnel 107 is molded into the deck 102 at the bow end 104 and a forestay guide 108 is also molded through the deck immediately rearwardly from the funnel 107. A spinnaker guide tube 109 is connected to the funnel 107 at 110. A mast aperture 111 is also molded through the deck 102 and has a depending collar 112 extending therebelow and an upturned bead 113 extending thereabove. A similar bead 113 surrounds the forestay guide 108. A sheet guide 114 is also provided through the deck rearwardly of the mast aperture 111 and an inclined surface 115 extends from the bead 113 to a support board 116 on which a sheet clip 117 is mounted.

The deck 102 also has a large cockpit aperture 118 surrounded by a bead 119 with an inclined peripheral surface 120 extending from the bead to the compartment under the deck. The deck has an upper surface layer 121 and a bottom surface layer 121a with the foam core 9 therebetween.

A rudder post tube 122 is mounted in an aperture of the deck surrounded by a bead 123 and has a collar 124 seated in this aperture and carrying an internal bearing bush 125. The lower end of the tube 122 projects freely through a recess 126 in the hull bottom with a reduced diameter outlet end 127 receiving a bushing sleeve 128.

Figure 1B:
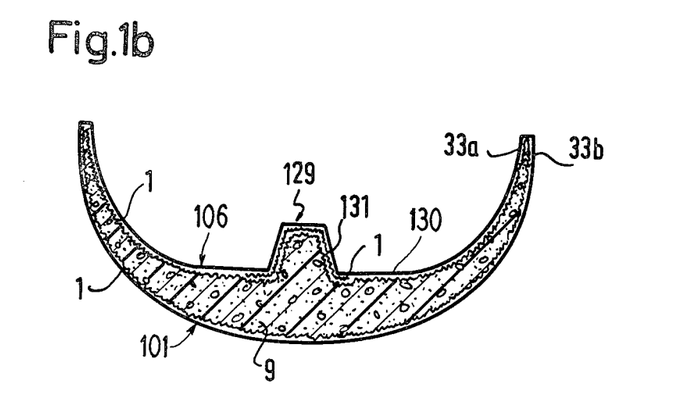
FIG. 1b is a transverse sectional view through the sailboat body of FIG. 1a in advance of the keel.

The hull 101 has a central rib 129 of trapezoidal shape extending longitudinally from the bow to the stern and raised above the bottom 130 of the inner shell 106 as best shown in FIG. 1b. Reinforcing laminates 131 surround the foam in the raised rib or beam area 129 and may have underlying laminations 131a to further unite the foam 9 to the inner bottom shell 106.

An open bottom trapezoidal recess for the keel fin 105 is provided in the bottom of the hull extending into the central longitudinal rib 129 about midway between the bow 103 and stern 104 and is provided with a retaining fitting 132 receiving the centering head 133 of the keel fin which has a main fin body 134 depending to a molded-in ballast 135 at the bottom end thereof. A laminar reinforcement 136 is provided in the keel fin and a transition zone 137 joins the thin surface portion 135 with the centering head 133. A second retainer fitting 138 is provided at the forward end of the keel fin receiving recess.

A mast foot 139 is anchored in the bottom of the cockpit under the mast aperture 111 through the deck.

Forestay reinforcing laminates are provided at 140 and bow reinforcement laminates are provided at 141 underlying a forestay rail 142 anchored to the inner bottom 106.

Keel bolts 144 cooperate with lugs 145 in the keel fin 105 to suspend the keel fin from the hull.

A depending flange 148 at the stern end of the deck 102 fits on the upper end of the stern 103.

In accordance with this invention, a sailboat of the above described construction has the foam core hull molded in the hereinafter described molds of this invention.

Figure 2A:
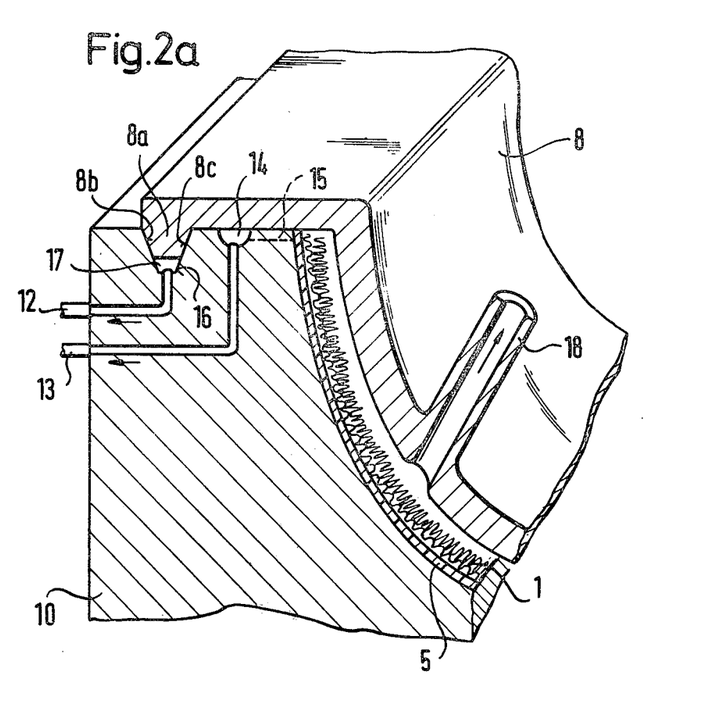
FIG. 2a is a fragmentary, somewhat diagrammatic perspective view of a mold and vacuum bag assembly of this invention.
Figure 2B:
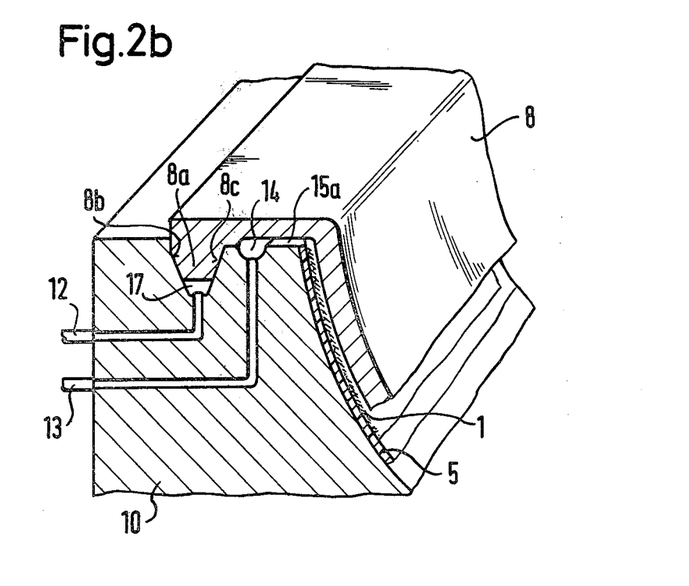
FIG. 2b is a view similar to FIG. 2a but showing an air extraction passage in the vacuum bag instead of in the mold.

As shown in FIGS. 2a and 2b, a lower mold half 10 has the mold recess on the inner face thereof upon which one or more synthetic plastics material layers 5 are applied with the application of a parting compound to facilitate separation from the mold surface while wovenfibrous material laminate sheets 1 are placed on the top face of the layer 5 while it is still in unset wet or flowable condition. The laminates are pressed lightly on the uppermost synthetic plastics material layer to remain in position and then a vacuum bag 8 is placed on this multi-layer laminate insert 1. The vacuum bag has a suction connection 18 which can be provided at several points along the length of the bag. A peripheral sealing rib 8a on the bag fits in a peripheral sealing groove 16 in the mold parting line. The groove 16 is approximately trapezoidal shaped and the sealing rib 8a has an outer sealing side or lip 8b and an inner sealing side or lip 8c to snugly fit in the groove 16. The vacuum bag 8 is composed of neoprene rubber or the like and a cavity 17 is provided at the bottom of the sealing groove 16 under the rib 8a which is evacuated through a suction passage 12 so that the sealing rib 8a will be sucked into the sealing groove 16 to provide a completely sealed closure surrounding the peripheries of the mold and vacuum bag. Then when suction is applied to the outlet 18, the bag is drawn tightly against the laminate insert 1 to press the fibers uniformly into the unset plastic layer 5. All air between the bag and the fibrous layer is exhausted so that no bubbles or voids can remain between the fibrous layer 1 and the plastic layer 5.

Between the sealing groove 16 and mold cavity, a venting collector channel is formed at 14 and is exhausted through a suction line 13. This channel 14 is connected with intersecting passages 15 in the mold parting line. These passages are effective to relieve foam that is pumped into the mold cavity between mold halves as will be hereinafter more fully described, allowing air to escape from the mold cavity while throttling the air released to build up a back pressure or to create a suction effect by applying vacuum to the suction line 13. The foam can, therefore, spread out gradually and evenly while air ahead of the foam can escape through the passages 15 with a throttling action. In FIG. 2a, the collecting channel 14 and the passage 15 are formed in the mold 10 while in the modification of FIG. 2b, these passages 14 and 15a are formed in the bottom face of the flange area of the vacuum bag 18.

To lift the vacuum bag out of the sealing groove 16 and to accelerate the removal of the bag from the mold, the suction passage 12 can be charged with compressed air to separate the mold halves and lift the sealing rib 8a out of the sealing groove while the suction passage 13 can also be charged with air to lift the vacuum bag off of the plastics laminate.

Figure 2C:
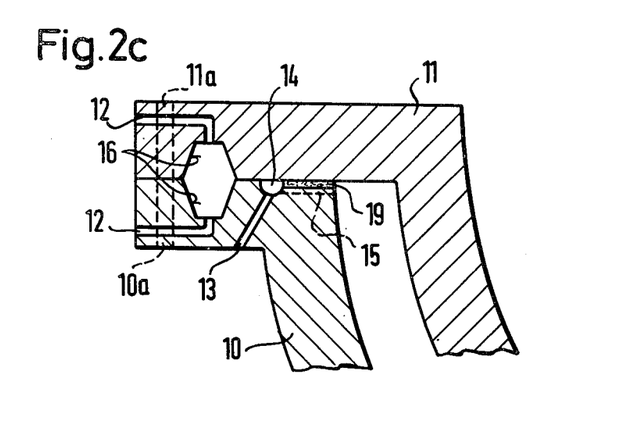
FIG. 2c is a fragmentary transverse cross sectional view of the flange area of top and bottom mold halves with a sealing strip therebetween.
Figure 2D:
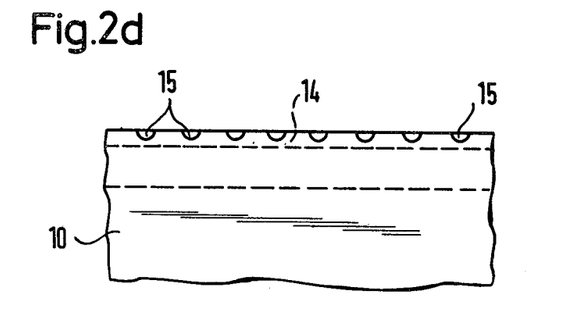
FIG. 2d is a fragmentary elevational view of the bottom mold half showing the plurality of air extracting passages 15 along the length thereof at the parting line.
Figure 2E:
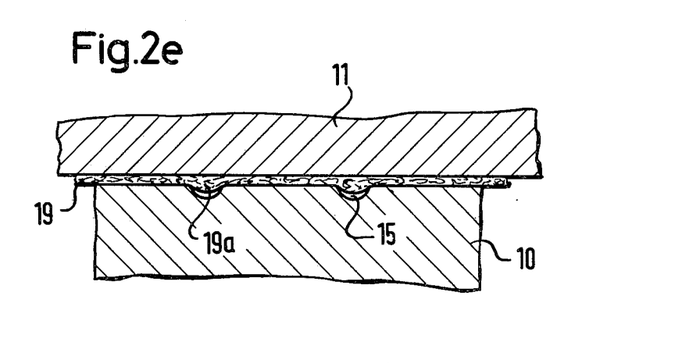
FIG. 2e is a view similar to FIG. 2d but showing the sealing strip and the top mold half.

As shown in FIG. 2c, a top mold half 11 overlies the bottom mold half 10 which has the suction channel 14 and the connecting channels 15 as described above in connection with FIG. 2a. This top mold half 11 has a peripheral flange overlying a peripheral flange of the bottom mold half and also provided with a sealing recess 16 mating with the sealing recess 16 in the flange of the bottom half 10 and adapted to be evacuated by suction lines 12 to draw the two mold halves tightly together in sealed engagement with a sealing strip 19 of fibrous material or the like which is interposed between the flanges of the top and bottom mold halves over the channels 15 and will be drawn into the channels at 19a as shown in FIG. 2e when vacuum is applied to the line 13.

Bores 10a and 11a are provided through the flanges of the mold halves to receive clamping bolts to lock the halves together during the foaming operation.

Figure 3A:
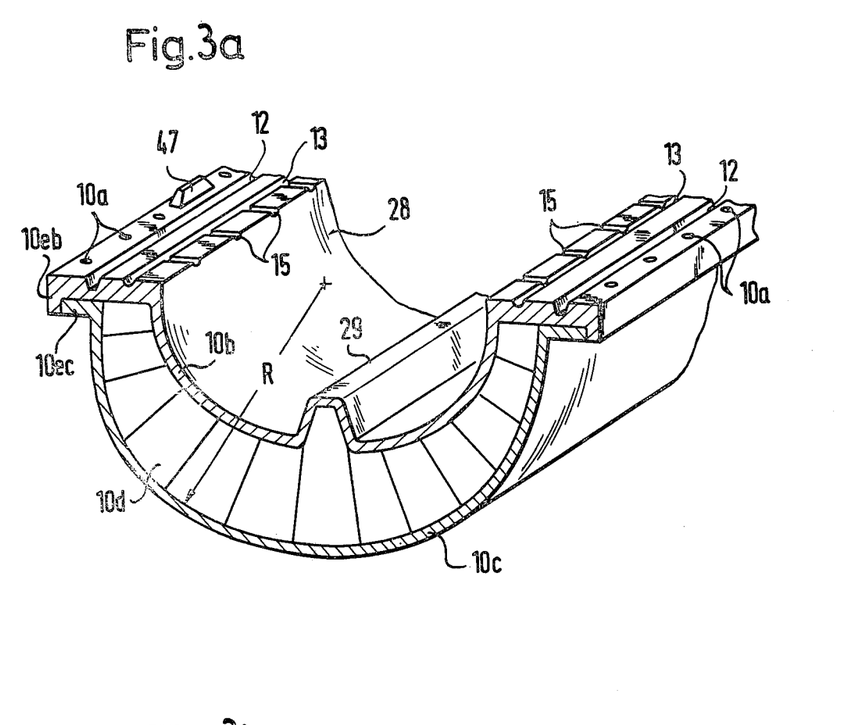
FIG. 3a is a fragmentary perspective view of a mold according to this invention reinforced with radial supporting struts.
Figure 3B:
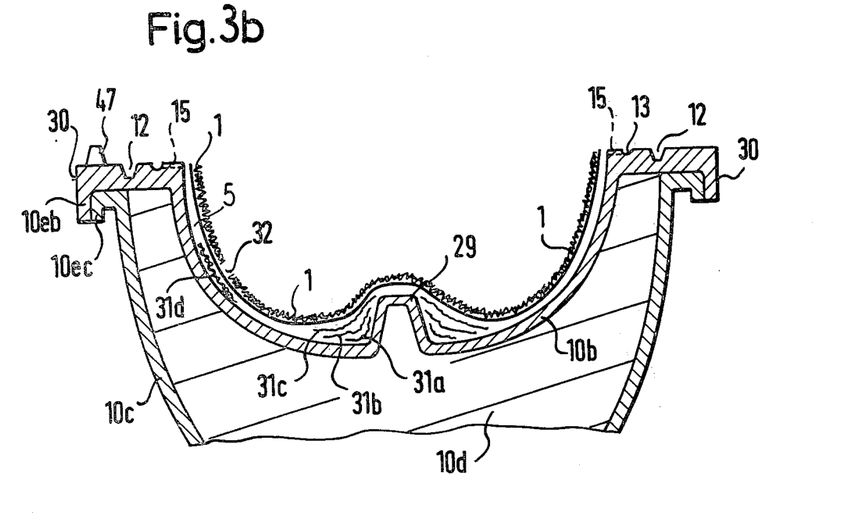
FIG. 3b is a transverse section through the mold assembly of FIG. 3a showing the application of fiber laminations thereon.

As shown in FIGS. 3a and 3b, the lower mold half 10 has an upper mold cavity defining plastics material layer or wall 10b and a spaced underlying supporting wall 10c. Since high pressure is created in the mold during the introduction of the plastics foam material, the molding wall 10b is reinforced against deformation by wood blocks, honeycomb rigid structures or the like, large area supports 10d extending radially between the walls 10b and 10c. The wall 10c is suspended as a free catenary curve from the outturned end flange 10ec surrounding the periphery of the lower mold half 10 or the curve may be semicylindrical shape having a radius R from the longitudinal center of the top of the molding cavity provided by the wall surface 28 and rib defining surface 29. In this arrangement, therefore, the lower mold half 10 has an outer supporting wall 10c and an inner molding wall 10b. This inner molding wall 10b has an outturned peripheral flange 10eb overlying the peripheral flange 10ec and containing the channels 12, 13 and 15 and the holes 10a.

As shown in FIG. 3b, the peripheral flange 10eb can have a downturned lip 30 for centering the flange on the peripheral flange 10ec of the bottom wall portion 10c and can also have upwardly projecting lugs 47 for seating in recesses on the bottom flange face of the overlying top mold half 11 (not shown).

As also shown in FIG. 3b, the reinforcing struts 10d between the walls 10c and 10b can extend diagonally crosswise instead of radially. As also therein shown, reinforcing fabric laminates 31a, 31b and 31c are positioned on the layer 5 adjacent the rib 29 and a reinforcing laminate 31d is introduced where desired along the curved side wall portion of the layer 5. The overlying fabric layer may have a junction area 32 of two adjacent sheets reinforced by the underlying laminate 31d which bridges any seam or gap between the sheets 1.

Figure 3C:
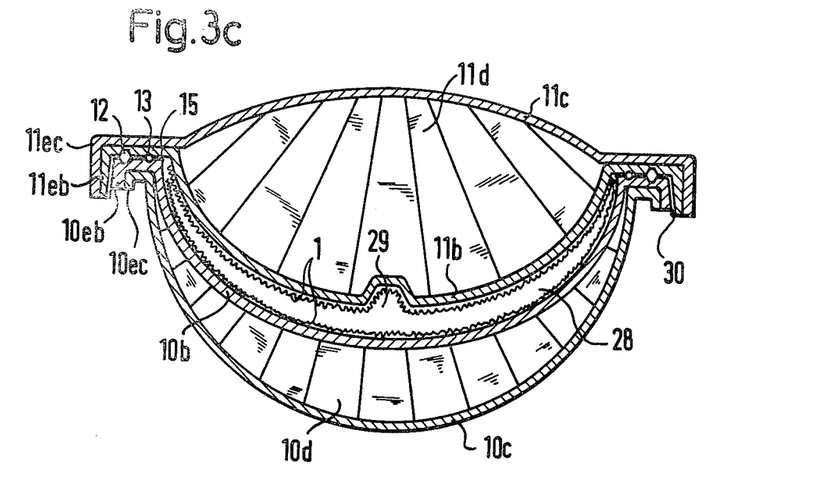
FIG. 3c is a view similar to FIG. 3b but illustrating the top half of the mold in position.

In FIG. 3c the top mold half composed of a mold wall 11b and a top supporting wall 11c with radial rib supports 11d therebetween is shown mounted on the bottom mold half composed of the walls 10b and 10c to cooperate therewith in forming the mold cavity 28. As there shown, the top mold half has a peripheral flange 11eb on the ends of the wall 11b around the periphery of the mold and overlying the flanges 10eb of the bottom mold half 10b and peripheral flange 11ec on the ends of the top wall 11c around the periphery of the mold and overlying the flange 11eb.

The evacuating chambers 12 and 13 are provided between the flanges 10eb and 11eb and the tapered outer flange surface 30 on the flange 10eb centers the cover flange in wedge-fitting relation. In this arrangement, therefore, each mold half is composed of two plastic dished members with flanged sides held together and with reinforcing struts therebetween so that the mold defining plastic portions 10b and 11b are firmly supported from overlying structure through the struts.

Figure 1C:
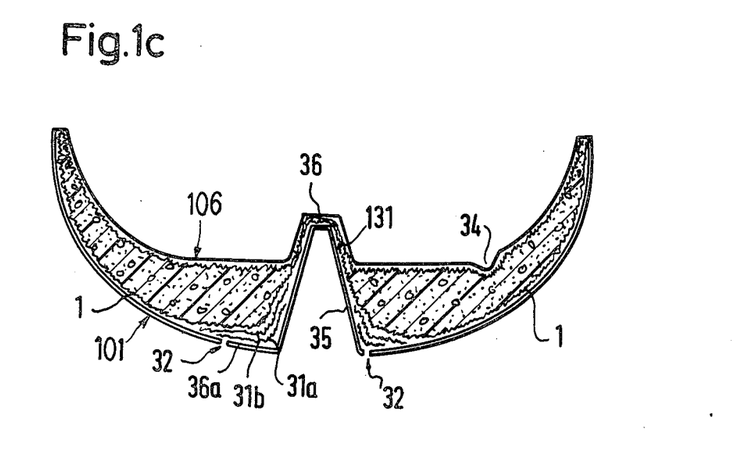
FIG. 1c is a transverse cross sectional view of the sailboat body of FIG. 1a taken through the keel area but with the keel removed.

As shown in FIG. 1b, the mold cavity provided by the mold halves, produces the boat shell 101 and the inner bottom shell 106 curving upwardly from a bottom 130 to adjoining end portions 33a and 33b which are sealed together at their top ends and the space therebetween is filled with the foam 9 reinforced by the laminations 1 and insert laminations which also bond the foam to the sheets 101 and 106. As shown in FIG. 1c, the keel fin recess has a rigid insert 35 fitted therein with outturned legs such as 36a underlying the hull bottom and any gap or seam 32 between the insert and hull sheet is bridged by underlying fabric reinforcement layers such as 31a and 31b. Also, a bilge or drain gutter 34 is molded into the inner bottom sheet 106.

Figure 3D:
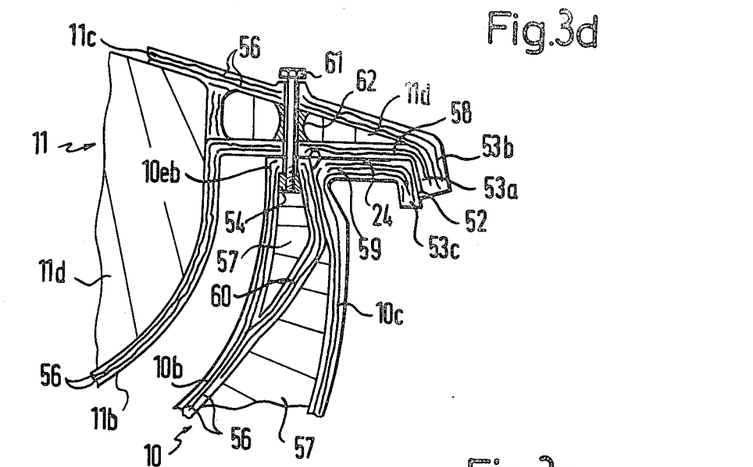
FIG. 3d is a somewhat diagrammatic sectional view of the flange area of a mold according to this invention reinforced with a core and rigidifying compartments.
Figure 3E:
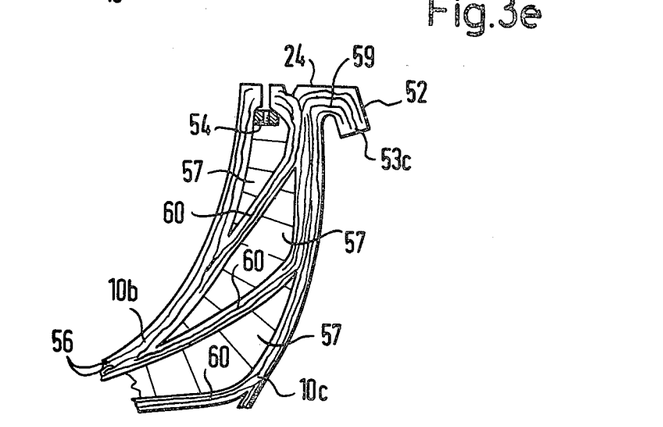
FIG. 3e is a view similar to FIG. 3d with the top mold section removed.
Figure 3F:
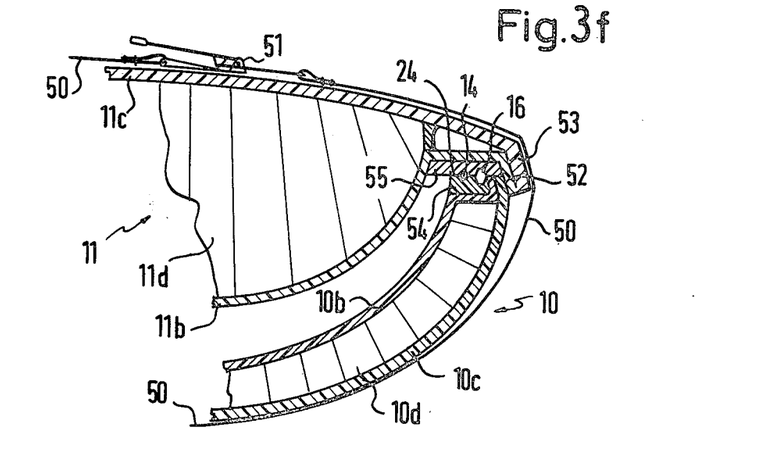
FIG. 3f is a view similar to FIG. 3c with the mold sections reinforced by a surrounding tension band.

As shown in FIG. 3f, tension bands such as 50 can be wrapped around the mold halves 10 and 11 and each tightened with a draw clamp 51 to reinforce the entire mold assembly against distortion even when heavily stressed during the foam filling operation. As there shown, the mold surface defining wall 11b has a downwardly tapered peripheral flange 52 centering an overlying flange 53 on the periphery of the top supporting wall 11c and these flanges are reinforced by laminar inserts 53a, 53b and 53c shown in FIG. 3d.

A rigid peripheral frame 54 is provided around the periphery of the bottom mold half 10 to mate with a rigid upper frame 55 around the periphery of the upper mold half 11 and underlying the flange of the wall part 11b of this upper mold half. These frame parts thus define the parting line 24 between the mold halves and also contain the sealing chamber 16 and evacuating passage 14.

In order to reinforce the mold walls 10b, 10c, 11b and 11c, fabric 56 can be embedded in these walls and branch walls 60 can be added to provide pockets receiving reinforcing struts 57. Further, as shown in FIG. 3d, a peripheral stiffening flange 58 is formed on the inner top mold part 11b while a peripheral stiffening flange 59 is formed on the outer bottom mold part 70c. The top and bottom mold halves may be bolted together by connecting screws 61 extending through spacer tubes 62 and threaded into the frame 54.

Figure 4A:
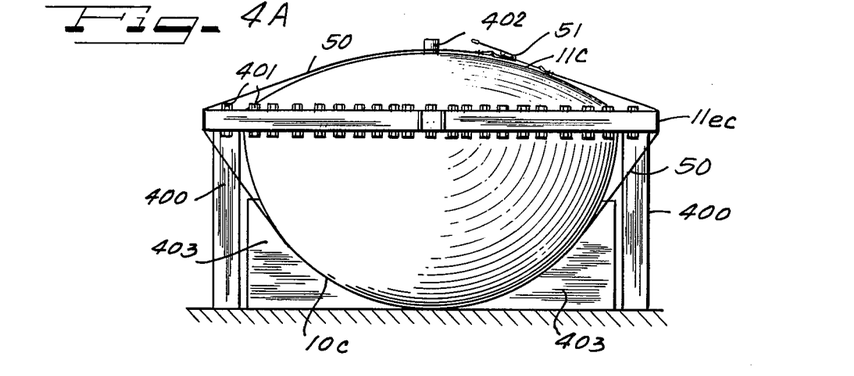
FIG. 4a is an end elevational view of a mold assembly of this invention mounted for receiving foam forming plastics material.
Figure 4B:
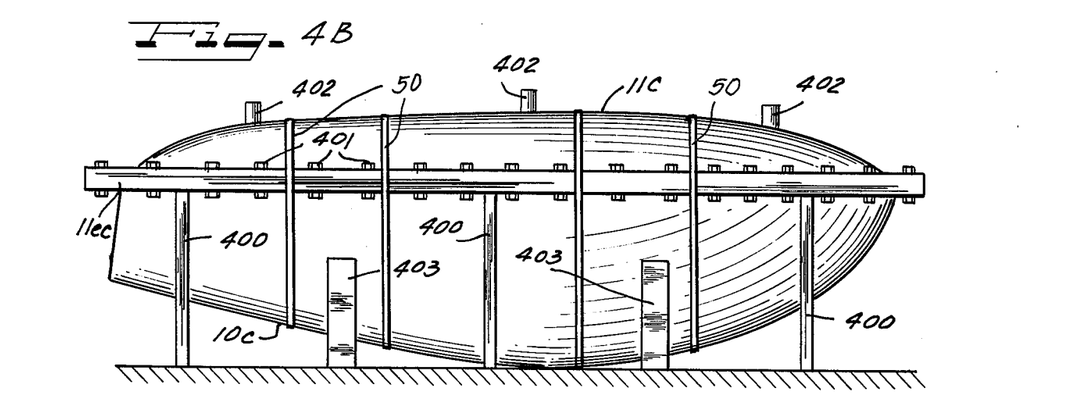

As shown in FIGS. 4a and 4b, the entire mold structure is supported on beams 400 which engage the undersides of the nested mold flanges of, for example, the mold assembly of FIG. 3c and the nested flanges are drawn together by bolts or clamps 401. Since the mold structure is self-supporting, spaced supporting beams 400 are sufficient for holding the mold assembly in its upright position for receiving the plastic foam forming filler as, for example, through the filler inlets 402.

In addition to, or in place of, the bolts or clamps 401, the mold halves can be tied together with the tension bands 50 tightened by draw clamps 51 as also shown in FIG. 3f.

Instead of the supporting beams 400 being used to support the mold assembly in an upright position as shown in FIGS. 4a and 4b, several transverse ribs 403 fitting the bottom mold wall 10c can be used at spaced intervals along the length of the mold. Thus, while the mold structure can be suspended from the peripheral flanges, it is also possible to support the mold on ribs such as 403.

Figure 4C:
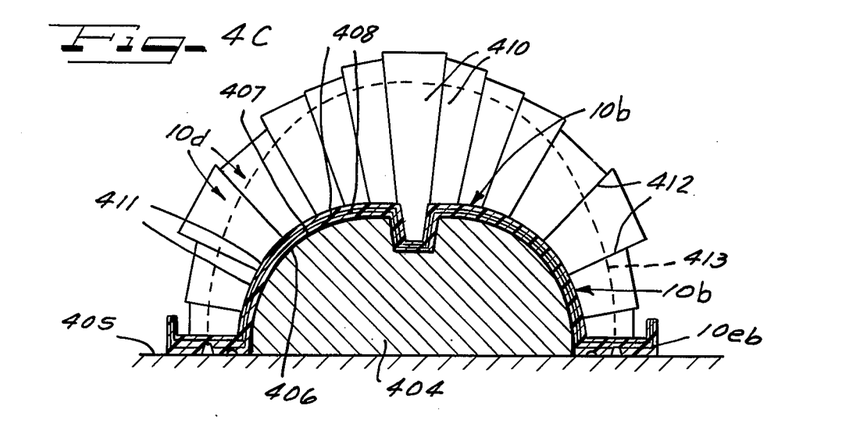
FIG. 4c is a diagrammatic transverse sectional view showing how a mold half is formed on a pattern of a boat.

FIG. 4c illustrates the manner in which a boat mold half is formed. As therein shown, a pattern 404 of a boat hull rests, in an upside down position on a support surface such as a floor 405. This pattern has an outer surface 406 shaped exactly in accordance with the exterior surface of the bolt hull that is to be molded. The surface 406 is covered with a release coat 407 and then several layers 408 of epoxy resin reinforced with fiberglas mats are applied to form the inner mold cavity defining wall member 10b together with the integral flange 10eb of the mold. Strut members 10d are then applied to press the layers 408 tightly against the pattern 404 causing it to intimately follow the contour of the surface 406.

As also shown in FIG. 4c, the strut members 10d are wedge-shaped wooden blocks 410 with inner ends 411 contoured to follow the surface 406 of the pattern. These blocks may vary widely in size and for boat hulls of from 8 to 15 meters in length and from 2.4 to 3 meters in width will have a cross section size at their inner contoured ends 411 varying between a size of 20 × 20 centimeters up to 40 × 80 centimers or greater. The blocks do not extend the full length of the mold and they have tapered sidewalls 412 providing wedge fits around the pattern. The blocks are wedge fitted to form an arch around the pattern 404 and include a keystone at the top of the arch.

To further reduce the weight of the molds, the wooden blocks can be replaced with open mesh or cellular light weight blocks of plastics or the like structural material.

The blocks are cemented together forming a solid strut support for the mold cavity defining portion 10b of the mold.

As shown in dotted lines 413, the outer ends of the blocks 410 are trimmed into the shape of a catenary curve. The load which the cavity wall 10b is to support during the molding operation, is calculated at arbitrary positions in several planes of cross section along the length of the mold and the catenary curve shape to be assumed at these cross sections is plotted. This set of catenary curves is then used to provide a set of templates forming a guide to shape the outboard ends of the blocks 410 to the catenary shape. Since the form of a catenary curve is mathematically defined, the surface of the strut members are thus shaped along the length of the mold and the supporting wall member 10c of the mold is then formed over the thus shaped strut members. This outer-supporting wall 10c is formed with its out-turned rigid flange and is built up in the same manner as the inner wall 10b. The end product, of course, is the mold half shown in FIG. 3a.

The blocks 410 are wedge-shaped in such a way that their sidewalls 412 substantially follow the force vector so that the contoured surfaces 411 at the inner ends of the blocks are normally perpendicular to the wall 10b at the areas engaging the wall. The same is true of the contact areas between the outer ends of the block and the supporting wall 10c formed therearound. Thus, the mold composed of the inner cavity defining wall member 10b, the struts 10d, and the outer wall member 10c, becomes a rigid self-sustaining structure which is built up from easy-to-handle components and can be a very large size accommodating the molding of boat hulls, for example, up to and greater than 15 meters in length and 3 meters in width or greater. The finished mold is relatively light in weight and is easily handled.

It will, therefore, be understood that this invention provides plastic material molds for the production of sailboat hulls having a rigid core covered by thin overlying shells. These molds may have lightweight mold walls reinforced with inserts carried by overlying walls and the overlying walls may be suspended from rigid peripheral frames or flanges. It will be understood that many variations in shapes and reinforcing arrangements may be made without departing from the scope of this invention.

I claim:

1. A mold adapted for the production of foam-filled boat hulls which comprises a bottom mold half having a peripheral outturned side flange and defining a bottom mold cavity within the peripheral flange, a top mold half having a peripheral outturned side flange overlying the peripheral flange of the bottom mold half and defining within the peripheral flange a top wall for the mold cavity, said peripheral flanges of said bottom and top mold halves defining the parting line for the mold and having mating portions defining grooves, means for venting said grooves to suction to draw the peripheral flanges together to seal the parting line and for venting said grooves to pressure to open the parting line and separate the mold halves, and additional means in one peripheral flange for venting air from the closed mold cavity.

2. The mold of claim 1 wherein both the top and bottom mold halves have inner mold cavity defining walls and outer supporting walls with reinforcing struts between the supporting walls and mold cavity defining walls.

3. The mold of claim 1 wherein the peripheral outturned flange of the bottom mold half suspends a supporting wall in the form of a catenary.

4. The mold of claim 1 wherein the top mold half has a flexible vacuum bag having its peripheral flange overlying the peripheral flange of the bottom mold half and a lip on the top half mold flange adapted to be drawn into the groove of the bottom half mold flange for sealing the vacuum bag to the bottom mold half.

5. The mold of claim 4 wherein passages are provided between the bag and mold flange to vent air from the space between the vacuum bag and the mold.

6. The mold of claim 1 wherein the additional means are a longitudinal groove in one peripheral flange and a plurality of passages connecting the longitudinal groove with the mold cavity.

7. The mold of claim 1 including a rigid peripheral frame imbedded in said peripheral out-turned flanges of said top and bottom mold halves.

8. A plastics material mold adapted for the production of foam filled plastic skin boat hulls which comprises top and bottom plastic mold halves, each mold half having an outer support wall suspended and supported from a peripheral flange and an inner mold cavity defining wall suspended from a second peripheral flange and the said support wall and said mold cavity defining wall of each mold half spaced from one another defining a space therebetween, a plurality of abutting struts filling each space rigidifying said mold cavity defining walls, said flanges of all said walls being stacked in mating relation to seal a mold cavity between the mold cavity defining walls of each mold half, all of said walls supported from said flanges, and said mold cavity defining walls being supported around said mold cavity be contact with a surface of at least some of said abutting struts to resist the deformation of said mold cavity defining walls in the presence of high pressure in the mold cavity.

9. A light weight plastics mold for the production of foam filled boat hulls up to 15 meters in length and 3 meters in width and capable of withstanding high pressures which comprises top and bottom plastics sheet mold halves defining therebetween a boat hull molding cavity, each mold half having a first supporting wall member with a peripheral out-turned first rigid flange, a second mold cavity defining wall member interiorly of said supporting wall member with a peripheral outturned second rigid flange, rigid wedge blocks having ends contoured to the shapes of said first and second wall members and positioned to engage said wall members substantially normal to the surface areas of the wall members supported thereby, said flanges of said wall members being stacked together when the mold halves are mounted for a molding operation, and means clamping said stacked flanges to seal the mold cavity defined by the first wall member of each mold half.

10. The mold of claim 9 wherein the wedge blocks are wood and are cemented together.

11. The mold of claim 9 wherein the wedge blocks are tapered to form an arch around the first wall members and have outer ends in the shape of a catenary curve.

12. The mold of claim 9 wherein the wedge blocks have tapered sides and cross-sectional areas at the ends engaging the first supporting wall of the mold half of from 20–40 centimeters in width and 20–80 centimeters in length.

13. The mold of claim 9 wherein said flanges of the wall members are nested together.

14. A lightweight plastics material mold for the production of foam filled boat hulls under high pressure which comprises top and bottom mold halves defining therebetween a boat hull molding cavity, each mold half being formed from first and second plastic sheets including a first plastics sheet with a peripheral out-turned first rigid flange and an arcuately curved thin sheet portion interior of and suspended from said first flange, and a second plastics sheet nestled in said first plastics sheet having a peripheral out-turned second rigid flange and an arcuately curved thin sheet portion interior of and suspended from said second flange, said second flange of the bottom mold half mounted on said first flange of said bottom mold half, said second flange of the top mold half mounted on the second flange of the bottom mold half and said first flange of the top mold half mounted on the second flange of the top mold half to thereby provide a stacked flange structure, the curved thin sheet portions suspended from the flanges of each mold half being in spaced relation, the curved thin sheet portions of the second sheets of the top and bottom mold halves defining therebetween a boat hull molding cavity, abutting radially extending strut members filling the space between the first and second plastics sheets having outer ends engaging and supported by the curved thin sheet portion of the first plastics sheet and having inner ends engaging and supporting the curved portion of the second plastics sheet together with tapered side walls maintaining the struts substantially perpendicular to the area of the curved portion of the second plastics sheet supported thereby to resist deformation thereof for maintaining the configuration of the molding cavity under the high pressure of the molding operation, and said second flanges being separable to open the mold cavity for removal of a molded boat hull.

15. The mold of claim 14 wherein the arcuately curved portion of the first sheet suspended from the first rigid flange of the bottom mold half is a free catenary curve and the strut members extend radially with inner ends shaping the curved portion of the second sheet and outer ends contoured to engage the catenary curve of the first sheet.

* * * * *